United States Patent [19]

Pons

[11] 4,364,079
[45] Dec. 14, 1982

[54] PROCESS OF ANALYSIS OF THE CONVERGENCE OF A CATHODE-RAY TUBE WITH THREE GANGED GUNS AND A DEVICE FORMING A PICK-UP ALLOWING IMPLEMENTATION OF THIS PROCESS

[75] Inventor: Claude Pons, Grotta Ferrata, Italy

[73] Assignee: Videocolor (S.A.), France

[21] Appl. No.: 249,568

[22] Filed: Mar. 31, 1981

[30] Foreign Application Priority Data

Apr. 2, 1980 [FR] France .................................. 80 07412

[51] Int. Cl.³ ............................................. H04N 9/62
[52] U.S. Cl. ..................................... 358/10; 315/13 C
[58] Field of Search ......................... 358/10; 315/13 C

[56] References Cited

U.S. PATENT DOCUMENTS 4,001,877  1/1977  Simpson ................................ 358/10
4,193,086  3/1980  Kawaguchi ........................... 358/10

FOREIGN PATENT DOCUMENTS 1220900  1/1971  United Kingdom .

Primary Examiner—Richard Murray
Attorney, Agent, or Firm—Pollock, Vande Sande & Priddy

[57] ABSTRACT

A process of analysis of convergence along two orthogonal components of the three guns in a color television tube with ganged guns involves, for example, placing an analysis slit 20 in front of the screen of the cathode-ray tube in order to observe at least three luminophore columns 15 of different colors in full width, of causing a luminous line of a single color to pass by, turning on only the corresponding gun in front of said slit, and of measuring the current in the deviator of the cathode-ray tube for which the maximum light intensity is observed through the slit, and of beginning these operations again for each of the three colors, the measured values making it possible to deduce the convergence gaps of the beams at the placement of the slit. The invention allows automatic convergence correction of the cathode-ray tube.

13 Claims, 11 Drawing Figures

PROCESS OF ANALYSIS OF THE CONVERGENCE OF A CATHODE-RAY TUBE WITH THREE GANGED GUNS AND A DEVICE FORMING A PICK-UP ALLOWING IMPLEMENTATION OF THIS PROCESS

FIELD OF THE INVENTION

The invention concerns a process for analysis of convergence in a cathode-ray tube, in particular for a color cathode-ray tube, and concerns more particularly a process allowing quick and essentially automatic measurement of gaps of convergence between the beams produced by guns. The invention likewise concerns more particularly a device forming a pick-up allowing the implementation of this process. The invention was in particular developed to allow automation of the entire process of adjusting convergence in color television tubes with three ganged guns and a shadow mask.

BRIEF DESCRIPTION OF THE PRIOR ART

To data there is no method for convergence analysis that is sufficiently precise and rapid for color television tubes. In particular, the simple method consisting of measuring the distances separating the points of impact of the beams on the screen, in the absence of scanning, is hardly applicable because of the dangers to which it subjects the luminophores on the screen.

One known method of analysis consists of putting a test pattern on the screen giving lines and columns simultaneously of at least two of the three colors and directly evaluating their divergence on the screen. The analysis is thus purely visual (whether done directly or under microscope) and can be accomplished only by a very experienced operator. Complete analysis and convergence corrections of the cathode-ray tube are therefore done in this case almost entirely manually, and this is one of the longest and most delicate phases encountered in the tuning of a television cathode-ray tube.

A more or less automated method is also known, which consists of analyzing an image on the screen by means of a trichromatic television camera. Such a method results in costly and complicated equipment, and the results obtained are mediocre primarily because of the limited resolution of the camera.

The invention proposes an effective method of automatic analysis of convergence, more precise and faster than that just described briefly above, and which lends itself to automatic, large-series adjustment of trichromatic tubes. The method of the invention is distinguished from the known methods primarily in that the guns of the cathode-ray tube are turned on sequentially and not simultaneously, and in that the beams are furthermore subjected to scanning so as to produce a luminous line on the screen and to a slow deflection perpendicular to scanning in order to slowly move the line on the screen, then this line is observed to pass before an analysis slit, at that moment storing the current in the deviator. The differences between the values of the currents in the deviator taken for each gun are representative of the gaps of convergence between the latter.

BRIEF DESCRIPTION OF THE INVENTION

The invention concerns a process for analyzing the convergence of the three beams of a color cathode-ray tube with three ganged guns and a shadow mask, perforated with holes, preferably oblong, equipped with a deviator having horizontal and vertical coilings. With the invention it is necessary to turn on only one of the three guns in order to determine the projections of the gaps of convergence between the three beams along at least on reference axis, for example according to the horizontal and/or vertical deviation direction and of applying a slowly variable signal to the deflection coiling corresponding to said reference axis and a scanning signal to the other deflection coiling so as to produce a luminous line on the screen moving slowly parallel to said reference axis, of measuring the luminous intensity through an analysis slit located parallel to the direction of said scanning in an area of the screen where it is wished to determine the convergence characteristics, of noting the value of the current in said deflection coiling corresponding to said reference axis when the light intensity perceived through said slit is maximum, of repeating the same operations for the other two guns, and of calculating said projections of the gaps of convergence on said reference axis, knowing at least the three aforementioned current values and the deflection sensitivity of the cathode-ray tube in said area of the screen.

It will be noted that the proposed process makes it possible to obtain the projections of the gaps of convergence along an axis. In order to fully determine these gaps one is therefore led to apply the process in relation to two orthogonal reference axes which coincide, for example, with the width and the height of the cathode-ray tube, i.e., with the horizontal and vertical deviation directions of the tube. As will be seen further on, analysis utilizing a horizontal scanning of the tube, that is, with a reference axis parallel to the vertical deviation direction, is relatively easier than analysis utilizing a vertical scan, that is, with a reference axis parallel to the horizontal deviation direction. This is due to the arrangement of the luminophore columns of the three basic colors on the screen surface. However, the proposed process is applicable to both cases. In short, in the first case, it is enough to provide an opaque screen equipped with a horizontal slit facing the screen of the cathode-ray tube and to observe the luminous line through this slot, while in the second case the holes in the mask are directly utilized to perform the analysis of the relative position of the vertical lines of the three colors.

In this same vein, the invention also concerns a device forming a pick-up for analysis of the convergence of the three beams of a color cathode-ray tube with three ganged guns and shadow mask, perforated with holes, preferably oblong, equipped with two deviators, horizontal and vertical, the screen of which has luminophore columns in the three basic colors arranged in predetermined repetitive order, for the implementation of the process defined above. The inventive device has a housing equipped with an opening intended to be positioned against the outer surface of the screen of said cathode-ray tube facing an area of that screen for which it is wished to determine the convergence characteristics of the aforementioned guns. There is provided at least one photoelectric cell and at least one analysis slit or selection window positioned between said opening and said photoelectric cell.

The invention will be better understood and other goals, details and advantages thereof will be more apparent in the light of the following description, given in reference to the attached drawings, in which:

DETAILED DESCRIPTION OF THE INVENTION

Figure 1:
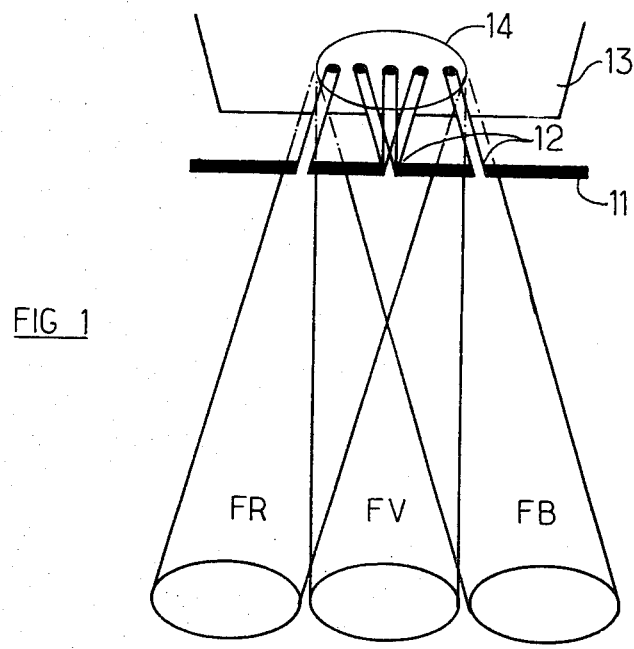
FIG. 1 is a diagram illustrating the convergence conditions on three electron beams from three ganged guns in a color television tube.
Figure 2:
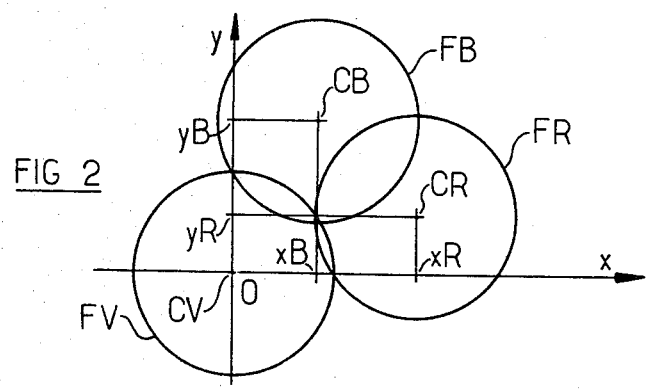
FIG. 2 illustrates a situation of nonconvergence between the three beams.

FIG. 1 illustrates the optimum conditions of convergence in a color television tube. In the remainder of the text, the various analogous elements of the tube corresponding to each gun, and the luminophore columns arranged on the inner surface of the cathode-ray tube's screen will be distinguished by the letters R, V or B, according to the basic color in question; that is, for a trichromatic tube, Red, Green (V), and Blue. Consequently, the three beams $F_R$, $F_V$ and $F_B$ emitted by the three ganged guns of the cathode-ray tube reach the shadow mask 11 with different incidences for making the color selection, and as is clearly shown in FIG. 1 only those parts (a low proportion) of the beams passing through the holes 12 of the mask 11 hit the screen to illuminate luminophore columns. The angles of incidence of the beams $F_R$ and $F_B$ in relation to the beam $F_V$ which reaches the screen at zero incidence are the primary parameters for the purity adjustment of the cathode-ray tube. If the tube is adjusted to purity, each beam passing through a single hole in the mask can reach only one luminophore column corresponding to its own color. The presence of the mask 11 greatly complicates analysis of the convergence of the three beams. Indeed, convergence is considered optimum when the three beams strike at a given instant (during the scanning) a single area 14 on the screen 13. In other words, the three light spots produced by the three beams must be merged on the screen 13. Now, this spot is imaginary, since it is not observable on the screen because of the presence of the mask. FIG. 2 schematically shows an equally imaginary situation of nonconvergence (i.e., assuming that the mask 11 has been removed) at a given site on the screen when the beams are not subjected to any scanning. It can be understood that it is possible to define the gaps of convergence by means of the projections from the centers $C_R$, $C_V$ and $C_B$ of the impacts of the three beams in a reference mark orthogonals xoy. Of course, the axis ox will be chosen parallel to the horizontal deflection direction of the tube, and the axis oy parallel to the vertical deflection direction. In the example in FIG. 2 where the center $C_V$ is shown merged with the origin of the reference mark xoy, it can be seen that the projections $x_R$, $x_B$ and $y_R$, $y_B$ of the centers $C_R$ and $C_B$ on the axes ox and oy respectively are sufficient to fully define the convergence gaps between the three beams. However, once again, this static situation illustrated by FIG. 2 is nonobservable, on the one hand because of the presence of the mask and on the other because of the difficulty of observing the impacts of immobile beams. This is why all the known methods described above are used with scanning of the screen by means of a test pattern consisting of horizontal and vertical lines of the three colors. The horizontal convergence gap component between two different colors is the distance between the vertical lines of these two colors, and the vertical convergence gap component is the distance between the corresponding horizontal lines.

To fully understand the reason for the very high precision of the process of the invention, it is necessary to know that the electron density in cross section of a beam emitted by one of the guns has a non-uniform distribution, basically Gaussian, which implies maximum luminescence at the centers $C_R$, $C_V$ and $C_B$ of the impacts on the cathode-ray tube. This increased luminescence at the center of impact of each beam is usable by photoelectric measurement to locate said center.

Figure 3:
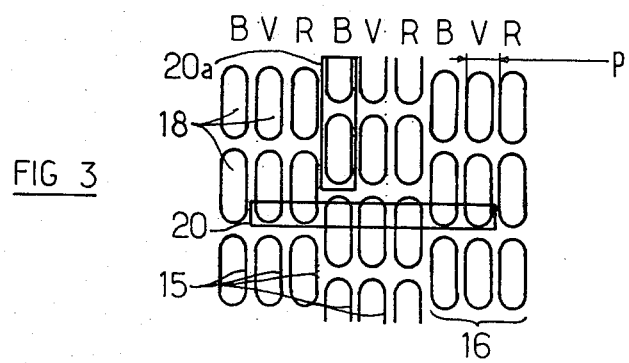
FIG. 3 illustrates an area of the cathode-ray tube for which it is wished to measure the gaps of convergence, as well as the analysis slits allowing implementation of the process.

FIG. 3 illustrates a small part of the screen of the cathode-ray tube (seen from the outside) with a certain number of luminophore columns 15 arranged essentially vertically vis-a-vis the normal display position of the television tube. The colors corresponding to the various columns 15 are indicated in the upper part of FIG. 3 by the letters B, V, R. Given the presence of the mask at the rear of the screen, illumination of the luminophore columns causes multiple images of the holes in the mask to appear (the latter are oblong in shape and have their greatest dimension oriented along the direction of the columns) in triplets 16 of the three colors, because of the differences in incidence of the three beams (see FIG. 1). Of course, the luminophore columns have different chemical compositions to correspond to the three basic colors, and they are arranged in a predetermined repetitive order (Blue, Green, Red, looking at them from outside the tube) and with a predetermined pitch p in relation to the perforation pitch in the mask 11. For obvious reasons of mechanical resistance, the oblong holes 12 in the mask are arranged in staggered rows so that the same holds true for the corresponding triplets. This customary particularity of all tubes with shadow mask and three ganged guns is put to advantage within the framework of the invention in order to determine the vertical components of the convergence gaps between the beams $F_R$, $F_V$ and $F_B$.

Indeed, if an opaque or at least frosted screen equipped with an analysis slit 20 at least as wide as six pitches p of luminophores (in fact, the width of the slit can be multiplied by the magnifying ratio of an optical system for observation of the luminophore columns placed between the cathode-ray tube and said slit) is arranged arbitrarily facing an area of the screen where it is wished to determine the gaps of convergence, one can be certain that at least one triplet 16 will be partially observable, but in its full width, through the slit 20. For good measurement precision, the only constraint is to place the screen so that the slit is essentially parallel to the horizontal deviation direction of the cathode-ray tube. Consequently, the parts of luminophores visible through the slit 20 all have the same ordinate in relation to the reference marks in FIG. 2, and it is certain that luminophore columns of the three colors are visible through the slit.

Figure 4:
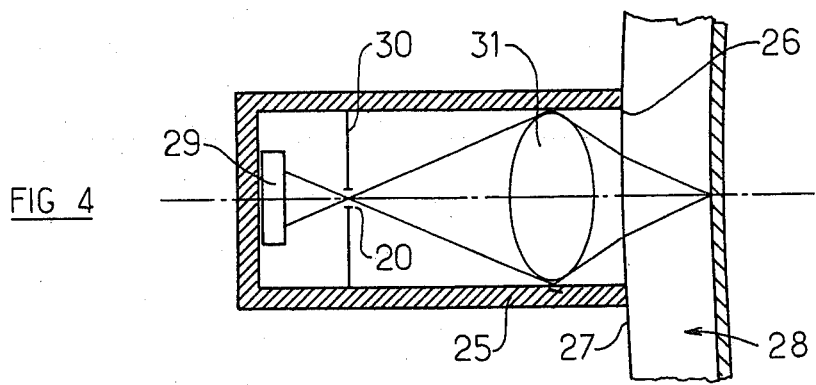
FIG. 4 is a schematic cross-sectional view of one mode of realization of a device forming a pick-up making it possible to implement the process.

The device forming the pick-up, making it possible to carry out this observation of the triplets through the slit 20, is diagrammatically shown in FIG. 4. It includes a housing 25 equipped with an opening 26 to be positioned against the outer surface 27 of the cathode-ray tube 28, facing an area of this screen for which it is wished to determine the convergence characteristics of the three beams. A photoelectric cell 29 is placed at the bottom of the housing 25, and the aforementioned opaque screen 30 is placed in the housing 25 between the pick-up 29 and the opening 26. A lens (or lens system) is likewise placed in the housing 21 between the opening 26 and the opaque screen 30 so that the slit 20 borne by the opaque screen 30 is essentially placed in a focal plane of the lens 31. Consequently, the correct positioning of the slit 20 is determined by that of the housing 25 vis-a-vis the cathode-ray tube.

Figure 5:
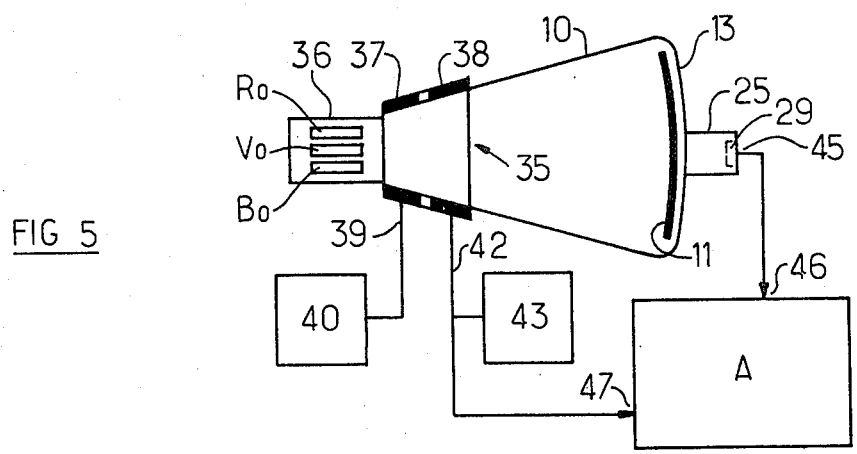
FIG. 5 is a block diagram illustrating all the equipment necessary to determine the projections of the convergence gaps along an axis parallel to the vertical deflection direction of the cathode-ray tube.

Implementation of the process of the invention makes use of the scanning control means 35 of the cathode-ray tube and of extremely simple scanning signal generators. The measurement installation has been briefly diagrammed in FIG. 5. The television cathode-ray tube 10 is shown equipped with its three electron guns $R_o$, $V_o$ and $B_o$ arranged in ganged fashion, that is, parallel in a single horizontal plane, while the tube's deviator 35 is arranged around the neck 36 between the three guns and the mask 11. The deviator 35 is entirely convention and consists of a ring of ferrite on which are wound the horizontal deflection coil 37 and the vertical deflection coil 38. The coil 37 is connected (link 39) to be fed by a standard scanning generator 40 analogous to that in any television receiver, while the coil 38 is connected (link 42) to be fed by a slowly variable voltage generator 43. If one of the guns $B_o$, $V_o$ or $R_o$ is turned on, the result on the screen is a horizontal line (developed by the generator 40) of the corresponding color, moving slowly (action of the generator 43) parallel to the previously defined axis oy, i.e., for the measurement in question, the reference axis mentioned above. The housing 25 is positioned facing an area of the screen 13 where it is wished to determine the convergence characteristics so that the aforementioned slit 20 is essentially parallel to the horizontal scanning direction controlled by the generator 40, and the output 45 of the photoelectric cell 29 as well as the link 42 are connected to two measurement inlets 46, 47 respectively, of an analyzer A. This analyzer will not be described in any detail. We shall limit ourselves to indicating that its essential function is to take into account, for example for storage, the value of the signal present at the inlet 47 when the signal present at the inlet 46 exceeds a maximum. In concrete terms, this analyzer may be a microcomputer programmed to store point by point the variations in time of the signals applied to the inlets 46 and 47 so as to determine the instant of the maximum signal applied at the inlet 46 and to note at that same instant the value of the signal at the inlet 47. The selection of such a microcomputer and its programming are within the reach of any competent technician in this area of electronics. We shall conclude this description of the device by noting that the alternative component of the signal delivered by the generator 40 does not need to be of a high amplitude to scan the full width of the screen; a lower amplitude adequate to create on the screen a light line of the approximate size of the slit 20 is sufficient.

The equipment which has just been described allows the process to be implemented. Indeed, when the horizontal light line created on the screen passes in front of the housing 25, and more particularly of the slit 20, the corresponding luminophore columns are illuminated, and the photoelectric cell 29 emits a maximum output signal when the center ($C_R$, $C_B$ or $C_V$) of the impact of the beam (which is cut off by the mask 11) passes through the middle of the analysis slit 20. According to the foregoing, the role of the analyzer A is therefore to store the value of the current in the vertical deflection coil 28 at that precise instant. The operation is repeated for each gun, and the current values stored are generally different. As we also know the tube's vertical deflection sensitivity, which is essentially constant for a area of the screen, the three current values can be converted into distances which, subtracted two by two, represent nothing other than the gaps between the centers $C_V$, $C_B$ and $C_R$ (FIG. 2) in projection on the axis oy. In other words, if we consider the particular case of FIG. 2 in which the position of the center $C_V$ is arbitrarily taken as reference for the reference mark oxy, the aforementioned gaps give values for the ordinates $y_B$ and $y_R$ by the following two relationships:

$y_B = (I_{Bm} - I_{Vm}) Sy$ (a)

$y_R = (I_{Rm} - I_{Vm}) Sy$ (b)

in which $I_{Vm}$, $I_{Bm}$ and $I_{Rm}$ are the three current values determined as indicated above and in which Sy is the vertical deflection sensitivity in the area of the screen in question.

The basic idea of the invention appears clearly at this stage of the description. Instead of causing a test pattern to appear on the screen with lines of the three basic colors and observing visually and with uncertainty the gaps in ordinates between the lines visible on the screen, an ordinate is arbitrarily fixed in the measurement area in question (this ordinate is that of the analysis slit 20), and the current is measured in the vertical deflection coil that is necessary to bring each beam into a position such that its impact takes place on the cathode-ray tube at that arbitrarily selected ordinate. The differences between the currents measured make it possible to determine the vertical components (along the axis oy) of the convergence gaps between the three beams.

Figure 6:
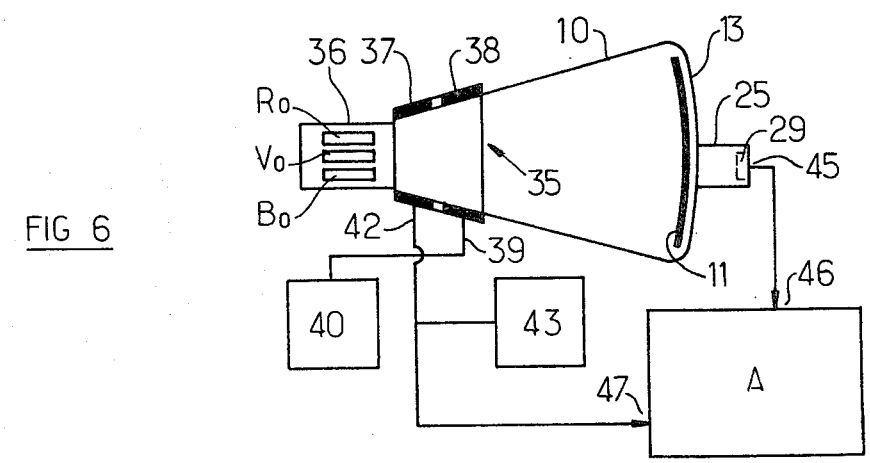
FIG. 6 is a block diagram illustrating all the equipment necessary to determine the projections of the convergence gaps along an axis parallel to the horizontal deflection direction of the cathode-ray tube.

To determine the horizontal components, the analysis is less simple but makes use of equipment that is essentially identical to that which has just been described. The only differences lie in the inverted joints of the horizontal and vertical deflection coils 37, 38 in relation to the generators 40, 43 and in the arrangement of the means of analysis inside the housing 25. These differences are apparent in FIG. 6, where it can be seen that the link 39 is connected to the horizontal deflection coil 38, while the link 42 is connected to the vertical deflection coil 37. This inversion of the generators 40 and 43 means that when one of the guns is turned on a vertical line of corresponding color is caused to appear on the screen, the line moving slowly parallel to the horizontal deflection direction. As in the preceding case, it is therefore necessary to arbitrarily determine a precise abscissa (since the reference axis is now parallel to the horizontal deflection axis) for all the beams, by means of a vertical analysis slit. However, if we refer to FIG. 3, we see that observation through a vertical slit which would be analogous to the slit 20, placed facing the screen, runs up against the following difficulty: if the slit is sufficiently fine as to create a measurement abscissa point as precise as possible, it will hardly be possible to observe more than a single color, since the luminophore bands are precisely arranged according to the vertical deviation direction.

According to the invention, oblong holes in the mask are used to form the analysis slit. Furthermore, the slit 20 described above and located outside the cathode-ray tube is now replaced by a selection window, the dimensions of which meet difficult criteria which will be explained further on. Starting from this principle, several variants of implementation of the process are possible.

According to an initial variant, the placement of the selection window 20a is selected so that it is placed as precisely as possible facing a luminophore column corresponding to a given color. In this case, again considering FIG. 3, the selection window 20a is not basically distinguished from an analysis slit as described previously. It is borne by an opaque or at least translucent screen placed between a lens such as 31 and a photoelectric cell such as 29. The window 20a is however oriented vertically and its noncritical height is preferably at least equal to an image height of a mask hole on the screen (multiplied if need be by the magnifying ratio of the lens 21; i.e., this dimension of the aforementioned image height is optically carried over in the plane of the opaque screen 30), while its width is low, on the order of one pitch p of a luminophore column. For example, if the analysis is begun by turning on the blue gun $B_o$, the selection window 20a must then be placed opposite a luminophore column corresponding to blue, as shown in FIG. 3. With the positioning correctly accomplished, the process is implemented in the same way as for determination of the projections of the convergence gaps on the axis oy, and the current is thus measured in the horizontal deflection coil corresponding to the maximum light intensity perceived by the photoelectric cell 29. Then, to perform the analogous measurements for the other two colors, the window 20a can be moved for each measurement by the value of one pitch p so that said narrow window 20a is always found opposite a luminophore column of a different color corresponding to the color of the gun turned on. In other words, if the window 20a is twice moved to the right in FIG. 3, it will be possible to repeat the measurement by successively turning on the green gun $V_O$ and the red gun $R_O$. However, calculation of the projections of the gaps along the axis ox must take into account the shifting (a whole number of pitches of luminophore columns) introduced in the measurement placements. By way of example, if we again consider the case of FIG. 2, arbitrarily taking as reference the center $C_V$ of the beam impact of the green as origin of the orthogonal reference mark xoy, we will have:

$x_B = (I_{Bm} - I_{Vm}) Sx - p$ (c)

$x_R = (I_{Rm} - I_{Vm}) Sx + p$ (d)

in which $I_{Bm}$, $I_{Vm}$ and $I_{Rm}$ are the previously determined current values and Sx is the horizontal deflection sensitivity in the area of the screen in question.

This process is precise but requires precise initial positioning of the selection window, which may take some time. The following variant avoids this precise positioning.

Figure 7:
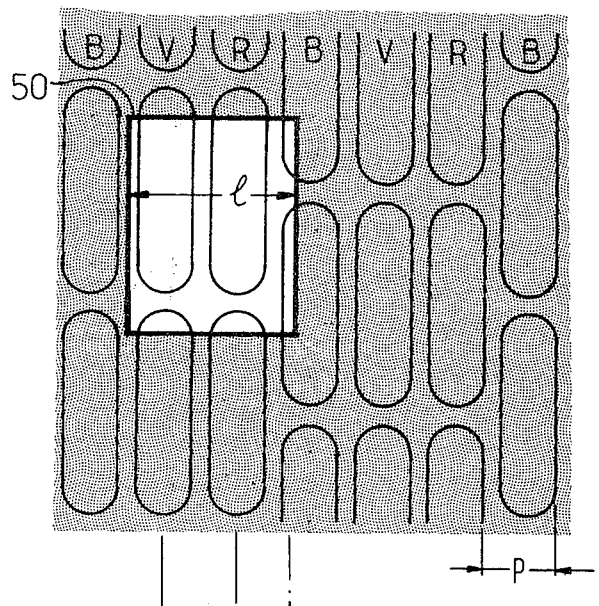
FIGS. 7 and 8 illustrate a variant of the process for determining the projections of the convergence gaps along an axis parallel to the horizontal deflection direction of the cathode-ray tube.

The second variant still maintains the principle of analysis by slit in the form of holes in the mask of the cathode-ray tubes, but the analysis window is wider in order to make it possible to achieve satisfactory observation of two neighboring luminophore columns by arbitrarily placing the housing 25 containing said selection window opposite the screen in the area in question (with the requirement that it be correctly oriented in relation to the orthogonal reference mark xoy), and without having to move said analysis window. Such a selection window 50 has been shown in FIG. 7 placed opposite the screen. The width 1 of the window 50 is such that:

$2p < 1 < 3p$

Figure 9:
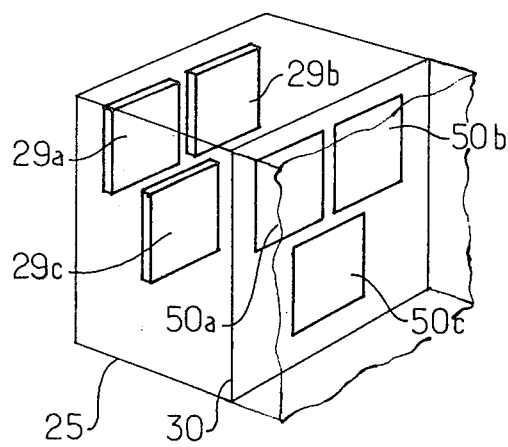
FIG. 9 is a partial view of a second mode of realization of the device forming a pick-up in FIG. 4.

In fact, this width is indicated assuming that the magnifying ratio of the lens 31 is equal to 1. If this is not the case, the dimension is to be multiplied by the magnifying ratio. In other words, the dimensions of the pitches p are optically carried over to the plane of the selection window 50. It is assumed that the arbitrary positioning of this window 50 has resulted in allowing observation through said window of two complete luminophore columns (in width), a green column and a red column, respectively, and part of a blue luminophore column. This is the case illustrated in FIG. 7. For the measurement, one proceeds as above, successively causing a vertical line corresponding to each gun to pass by, moving slowly from left to right in FIG. 7, while simultaneously measuring the current in the horizontal deflection coil for each measurement point of the light intensity perceived by the photoelectric cell 29. The current in the deflection coil, for which the perceived light intensity is maximum, can be adjusted in real time by using an appropriate algorithm and, if sufficient calculating means are available, integrated or associated into the analyzer A. The perceived light intensity values and the corresponding current values in the horizontal deflection coil can also be put into memory point by point, and an algorithm to determine the maximum subsequently applied. FIG. 9 illustrates the result of these measurements, i.e., the light intensity $L_V$, $L_R$ and $L_B$ recorded by the photoelectric cell 29 as each light line of corresponding color passed through the window 50, according to the corresponding current $I_V$, $I_R$ or $I_B$ in the coil 37. As was to be expected, the light intensity recorded for the blue beam is much lower then the light intensities recorded for the green and red beams, which themselves are essentially equal to the possible maximum since the green and red luminophore columns are entirely visible width-wise in the window 50. Under such conditions, the blue gun and the corresponding perceived signal are therefore temporarily eliminated, as they cannot be used to determine the true current in the coil 37 for which the light signal emitted by the blue column is maximum. However, this series of measurements makes it possible to calculate the projection of the convergence gap $x_R$ between the green and red guns $V_O$ and $R_O$ by applying the same formula (d) given above.

To determine the projection of the other convergence gap $x_B$ in the example described, it is sufficient to move—equally arbitrarily—the housing 25 (that is, the window 50) in the same area of the screen where it is wished to determine the gaps of convergence and to begin again the measurements described above, until, for a given series of measurements, the previously eliminated gun (the $B_O$ gun in the example in question) no longer produces the weakest light signal. When a new position of the window 50 has been found which satisfies this condition, it is then possible to determine the projection of the convergence gap between the gun $B_O$ and that of the two others for which the weakest light signal has not been recorded. Going back to the conventions defined above, if this other gun is the green gun $V_O$, then the formula (c) is directly applied. On the other hand, if this other gun is the red gun $R_O$, it is not necessary to seek another position for the window 50 for which the blue and green are concerned. One then determines the projection of the convergence gap between the guns $B_O$ and $R_O$, i.e., vectorially: $\vec{x_B} + \vec{x_R}$. Since $\vec{x_R}$ has been determined by the first series of measurements, it is possible to deduce $\vec{x_B}$ from it.

Figure 8:
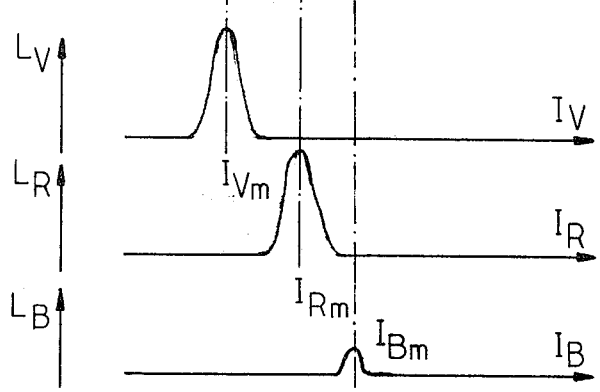

It will be noted that, depending on the initial positioning of the window 50, the curves shown in FIG. 8 may be of different amplitudes. A curve will always be observed in which the maximum will reach the highest possible value, but the other two may have more or less different and more or less lower maximum amplitudes; the most unfavorable (and very special) case is that in which the window 50 has been rigorously placed opposite the symmetry axis of a luminophore column. In this last case, it is best not to take into account such a series of measurements and to begin it again for another position, equally arbitrary, of the window. For all those cases in which a luminophore column is almost completely visible through the window 50, it has been verified that the measurement error introduced by taking into account the signal measured by the photoelectric cell 29 had little effect on determination of the maximum luminosity perceived and on taking into account the corresponding current value $I_m$. However, the process just described implies moving the housing 25 at least once, closing off the selection window 50. The third variant which will now be described makes it possible to avoid this constraint.

Figure 10:
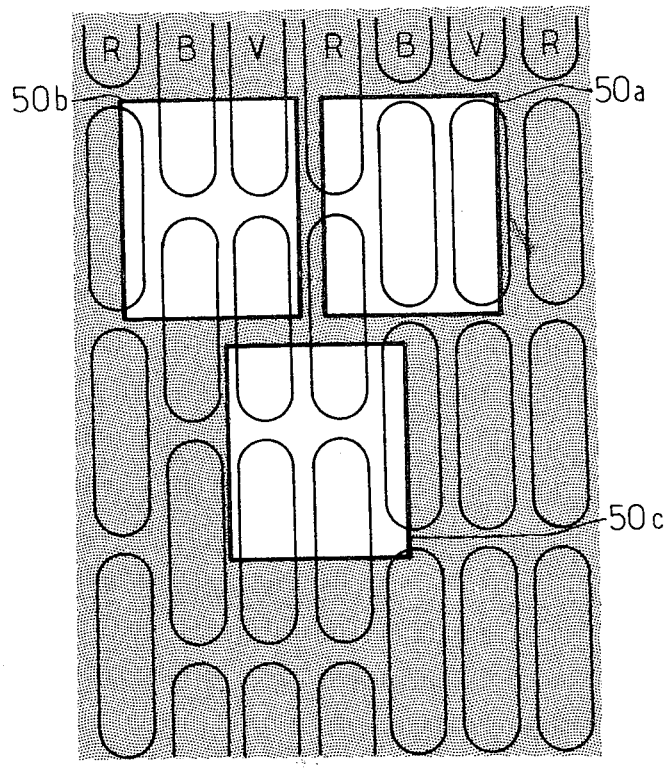
FIGS. 10 and 11 illustrate a variant of the process for determining the projections of the convergence gaps along an axis parallel to the horizontal deflection direction, implementing the device in FIG. 9.
Figure 11:
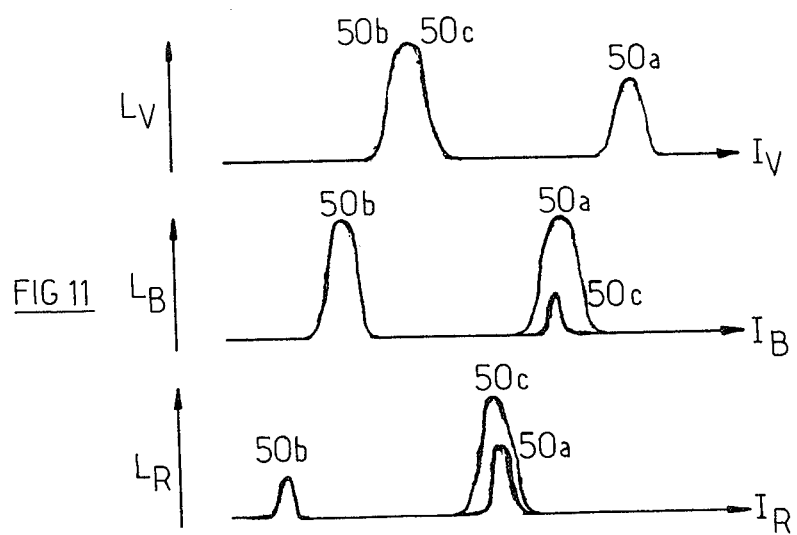

In order to implement this third variant, a device forming a pick-up is used, which is slightly modified and partially shown in FIG. 9, without the lens or lens system 31 which does not undergo any modification. In contrast, the opaque screen 30, still placed in a focal plane of the lens, this time includes three selection windows 50a, 50b and 50c. Each of these windows is analogous to the previously described window 50, that is, with a noncritical height at least equal to an image height of a mask hole on the screen and a width: $2p < 1 < 3p$. The dimensions of the image height and the pitch p are still considered to be optically carried over in the plane of the opaque screen 30. Furthermore, the three selection windows are arranged in relation to one another such that their centers form an isosceles triangle. Three photoelectric cells 29a, 29b and 29c, analogous to the previously described cell 29 and arranged in the same fashion as the windows, are placed behind the opaque screen 30, i.e., on the other side of that opaque screen in relation to the cathode-ray tube to be analyzed. FIG. 10 shows a part of the screen of the cathode-ray tube as visible through the windows when the housing 25 is correctly positioned opposite the screen of the cathode-ray tube, that is, with the width of each window positioned essentially parallel to the horizontal deflection direction of the cathode-ray tube. The housing 25 containing the three windows is arbitrarily positioned, with however a correct orientation, opposite the screen in an area in question where it is wished to measure the horizontal components of the convergence gaps, and the three guns are turned on one after the other, as previously, applying to the tube's deflection coilings the same current as previously, producing on the screen a vertical line moving slowly in a direction parallel to the axis ox. According to an important characteristic of the invention, analysis of the results of observing the passage of the light line through the three windows for each gun makes it possible in all cases to determine the horizontal projections of the convergence gaps between these three guns, without having to move the selection windows and hence the housing 25. These results are summarized in FIG. 11, analogous to FIG. 8. In other words, the three passes of the different-color lines produce signals read through the three selection windows by the respective photoelectric cells, and analysis of all these signals always gives sufficient data to calculate the projections of the convergence gaps along the axis ox. Thus, in FIG. 11, the light intensities $L_V$, $L_R$ and $L_B$ are fixed as a function of the currents $I_V$, $I_B$ and $I_R$ in the horizontal deflection coil, and also indicated is through what windows these signals are perceived, that is, through what corresponding photoelectric cell (29a, 29b or 29c) they are produced. By way of example, in the relatively favorable case of FIG. 10, it is possible to calculate the projection on the axis ox of the convergence gap between the guns $B_O$ and $V_O$ by analysis of the signals perceived through the window 50b alone, while it is possible to calculate the projection of the axis ox of the convergence gap between the guns $V_O$ and $R_O$ by analysis of the signals perceived through the window 50c alone. The arrangement of the windows and the invariable succession of the luminophore columns always makes it possible to recognize what luminophore column is responsible for such and such a light signal received, and therefore to apply the appropriate corrections of a whole number of pitches p to calculate the gaps. For example, a luminophore column observable through the window 50c is also at least partially observable through each of the other two windows. Generally speaking, it is possible to verify that in all cases:

one is certain of not perceiving two luminophore columns of the same color through the same window, because of the width of said window;

each window allows observation of at least one whole width of luminophore columns;

the luminophore columns of each of the three colors appear at least one in full width in all of the three openings; and to one given combination of colors read through each of the windows corresponds unequivocally one relative determined position of the luminophore columns. Consequently, this third variant makes it possible to measure, for an arbitrary position of the housing 25, the relative position of the vertical lines of the three colors by precisely making the correction of relative position (a whole number of pitches p) of the luminophore columns used for the measurement.

Of course, the invention is not limited to the different variants of the process which have just been described, or to the device usable for its implementation. Other extensions are also possible. For example, it is perfectly feasible to simultaneously place several housings 25 at the surface of the cathode-ray tube's screen, at selected points, so as to perform simultaneous measurements for all areas of the screen. The measurements thus obtained can be utilized to achieve a convergence adjustment of the tube that is fully automatic. This means that the invention covers all the technical equivalents of the means brought into play if these are within the scope of the following claims.

In particular, one can imagine selecting the reference axis not parallel to the axis of the two orthogonal scanning directions of the cathode-ray tube. In this case, the analysis slit analogous to the slit 20 in FIG. 3 could be oriented obliquely on the screen, but preferably always perpendicular to the reference axis chosen. Then the signals applied to the horizontal and vertical deflection coils, for example, would each consist of at least one scanning signal component and one slowly variable signal component, and calculations of the convergence gaps would have to take into account the two sensitivities of the vertical and horizontal deflection coilings.

I claim:

1. Process for analysis of the convergence of the three beams of a color cathode-ray tube with three ganged guns and shadow mask perforated with holes, preferably oblong, equipped with a deviator having horizontal and vertical deflection coilings, characterized by the fact that, for determining the projection of the convergence gaps between the three beams along at least one reference axis in a deviation direction preferably perpendicular to this reference axis, it consists of turning on only one of the three guns and applying a slowly variable signal to at least one of the deflection coilings and a scanning signal to at least the other deflection coiling so as to produce on the screen a luminous line moving slowly parallel to said reference axis, of measuring the light intensity through an analysis slit located parallel to the direction of the luminous line formed on the screen at the point where it is wished to determine the convergence characteristics, of fixing the values of the current in said coilings when the light intensity perceived through said slit is maximum, of repeating the same operations for the other two guns, and of calculating said projections of the convergence gaps according to said reference axis, knowing at least the three values of the aforementioned current and the deflection sensitivities of the cathode-ray tube in said area of the screen.

2. Process of analysis according to claim 1, characterized by the fact that, for determining the projection of the convergence gaps between the three beams along at least one reference axis in the horizontal and/or vertical deviation direction, it consists of turning on only one of the three guns and of applying a slowly variable signal to the deflection coiling corresponding to said reference axis and a scanning signal to the other deflection coiling so as to produce on the screen a luminous line moving slowly parallel to said reference axis, of measuring the light intensity through an analysis slit located parallel to the direction of said scanning in an area of the screen where it is wished to determine the convergence characteristics, of fixing the value of the current in said deflection coilings corresponding to said reference axis when the light intensity perceived through said slit is maximum, of repeating the same operations for the other two guns, and of calculating said projections of the convergence gaps along said reference axis, knowing at least the three values of the aforementioned current and the deflection sensitivity of the cathode-ray tube in said area of the screen.

3. Process of analysis according to claim 2, characterized by the fact that said slit is placed on the outside of the cathode-ray tube opposite said area of the screen between the latter and a photoelectric transducer.

4. Process of analysis according to claim 2, characterized by the fact that said reference axis being parallel to the horizontal deviation direction of said cathode-ray tube, said slit takes the form of at least one of the aforementioned holes in said aforementioned shadow mask located in said area, and that the light signals are observed through a selection window that is placed between the screen of said cathode-ray tube and a photoelectric transducer.

5. Process of analysis according to claim 4, applied to a cathode-ray tube in which the screen has luminophore columns corresponding to the three basic colors arranged in a predetermined repetitive order with a predetermined pitch, characterized by the fact that, in order to perform the measurement corresponding to one of the guns, there is a narrow selection window opposite a luminophore column corresponding to the gun in question, between the screen and a photoelectric transducer, and that, in order to perform the measurement corresponding to the other two guns, each time at least said selection window is moved the distance of said pitch optically carried over to the plane of said window, and that said projections of said convergence gaps between the guns are calculated by correcting by a whole number of pitches, depending on the relative positions of the luminophore columns on which said measurements where made, the determined distances, knowing the values of the aforementioned currents and said horizontal deflection sensitivity of the tube in the aforementioned area of the screen.

6. Process of analysis according to claim 4, applied to a cathode-ray tube in which the screen has luminophore columns in the three basic colors arranged in a predetermined repetitive order, with a predetermined pitch, characterized by the fact that there is a wide selection window, but narrower than three of the aforementioned pitches optically carried over to the plane of said window, in any placement whatsoever on the screen in said area in question, so that two adjacent bands of luminophores are essentially fully visible width-wise through said window, to measure the light intensities corresponding to the three passes of the light bands obtained successively from the three guns, each time fixing the current in said deviator corresponding to the maximum light intensity perceived, then, after having temporarily eliminated the gun for which the maximum intensity is lowest, of calculating the projection of the convergence gap between the other two guns by correcting by the value of one of the aforementioned pitches the determined distance, knowing the two current values and the horizontal deflection sensitivity in the area in question on the screen, of arbitrarily moving if need be in said area in question said selection window and of beginning again each time the successive measurements of said light intensities until, for a given series of measurements, the previously eliminated gun no longer produces the weakest light signal, and of then calculating in the same way the projection of the convergence gap between this gun and that of the other two for which the weakest light signal has not been recorded.

7. Process of analysis according to claim 4, applied to a cathode-ray tube in which the screen has luminophore columns corresponding to the three basic colors arranged in a predetermined repetitive order, with a predetermined pitch, characterized by the fact that there is an arrangement of three equal rectangular selection windows, of a width between two and three of the aforementioned pitches, optically carried over to the plane of said window opposite any placement in an area of the screen where the horizontal deflection sensitivity is known, the centers of said windows being preferably arranged according to the corners of an isosceles triangle, of successively producing on the screen the passage of said three luminous lines produced by each gun, and of measuring the corresponding light intensity through each window, fixing for each of them the current in the deflection coiling corresponding to a maximum light intensity, of selecting from among the measured signals collected through each window at the most two signals produced by two different guns and for which the maximum intensity noted is high, and of calculating the projections of the convergence gaps between the various guns, correcting by an appropriate number of pitches the determined distances, knowing the current values in the deviator corresponding to the maximum respective intensities of the signals selected and the horizontal deflection sensitivity in the area in question.

8. Device forming a pick-up for analysis of the convergence of the three beams of a color cathode-ray tube with three ganged guns and a shadow mask perforated with holes, preferably oblong, equipped with two deviator means, horizontal and vertical, and in which the screen has luminophore columns in the three basic colors arranged in a predetermined repetitive order, for implementation of the process according to one of the preceding claims, characterized by the fact that it includes a housing equipped with an opening to be positioned against the outer surface of said cathode-ray tube opposite an area on this screen for which it is wished to determine the convergence characteristics of said guns, at least one photoelectric cell and at least one analysis slit or selection window positioned between said opening and said photoelectric cell.

9. Device forming a pick-up according to claim 8, characterized by the fact that a lens or lens system is placed in said housing between said opening and said slit or selection window, and that the latter is placed essentially in a focal plane of said lens or lens system.

10. Device forming a pick-up according to claim 8, characterized by the fact that said slit is essentially parallel to the horizontal deviation direction of said cathode-ray tube when said housing is in a correct position opposite the screen of said cathode-ray tube and that this slit is at least equal in width to six pitches of luminophores optically carried over in the plane of said slit.

11. Device forming a pick-up according to claim 8, characterized by the fact that said selection window is narrow and has its greatest dimension parallel to the luminophore columns when said housing is in a correct position opposite the screen of said cathode-ray tube.

12. Device forming a pick-up according to claim 8, characterized by the fact that said selection window is rectangular that its width is essentially parallel to the horizontal deflection direction when said housing is in a correct position opposite the screen and that said width is between two and three pitches of luminophore columns optically carried over in the plane of said selection window.

13. Device forming a pick-up according to claim 8, characterized by the fact that it has three identical and coplanar rectangular selection windows the centers of which are essentially arranged at the corners of an isosceles triangle, that the width of each window is essentially parallel to the horizontal deflection direction of the cathode-ray tube when said housing is in a correct position opposite the screen of said cathode-ray tube, that said width is between two and three pitches of luminophore columns optically carried over in the common plane of said selection windows, and that each window is arranged between one of the aforementioned openings and a respective photoelectric transducer.

* * * * *